(12) United States Patent
Yerian

(10) Patent No.: US 7,021,782 B1
(45) Date of Patent: Apr. 4, 2006

(54) ILLUMINATED SAFETY APPARATUS AND BASE

(76) Inventor: Ralph Yerian, 17771 Galehouse Rd., Doylestown, OH (US) 44230

( * ) Notice: Subject to any disclaimer, the term of this patent is extended or adjusted under 35 U.S.C. 154(b) by 0 days.

(21) Appl. No.: 10/913,659

(22) Filed: Aug. 9, 2004

(51) Int. Cl.
*F21V 9/16* (2006.01)

(52) U.S. Cl. .......................... 362/84; 362/34; 362/101; 362/102; 362/171; 362/477

(58) Field of Classification Search .................. 362/84, 362/101, 102, 171, 207, 477, 34
See application file for complete search history.

(56) References Cited

U.S. PATENT DOCUMENTS

| | | | | |
|---|---|---|---|---|
| 2,493,205 | A | * | 1/1950 | Muldoon .................... 362/190 |
| 3,890,497 | A | * | 6/1975 | Rush ........................... 362/473 |
| 4,013,881 | A | * | 3/1977 | Sargent ....................... 362/102 |
| 4,763,126 | A | * | 8/1988 | Jawetz ........................ 340/985 |
| 4,812,952 | A | | 3/1989 | Clemens |
| 5,036,442 | A | | 7/1991 | Brown |
| 5,307,251 | A | | 4/1994 | Shaffer |
| 5,639,055 | A | * | 6/1997 | Fritz ........................... 248/519 |
| 6,070,987 | A | * | 6/2000 | Jarvik ......................... 362/84 |
| 6,217,187 | B1 | * | 4/2001 | Demsko ....................... 362/84 |
| 2004/0080929 | A1 | | 4/2004 | Golle et al. |

\* cited by examiner

*Primary Examiner*—Alan Cariaso
*Assistant Examiner*—Mark Tsidulko
(74) *Attorney, Agent, or Firm*—John D. Gugliotta; Olen L. York, III

(57) ABSTRACT

A safety apparatus having a base, a wand coupled to the base, and an illumination source retained by the wand. The base may include a recess to retain the illumination source, or an additional illumination source. The base may also include a port and a hollow interior for selectively filling the interior with ballast for support. The wand may include reflective material along the external circumference for increasing the visibility of the apparatus to on-coming traffic. The apparatus may be used to freely stand on a solid surface, or the base may be evacuated of ballast and used to buoyantly rest on the surface of an aqueous body.

35 Claims, 12 Drawing Sheets

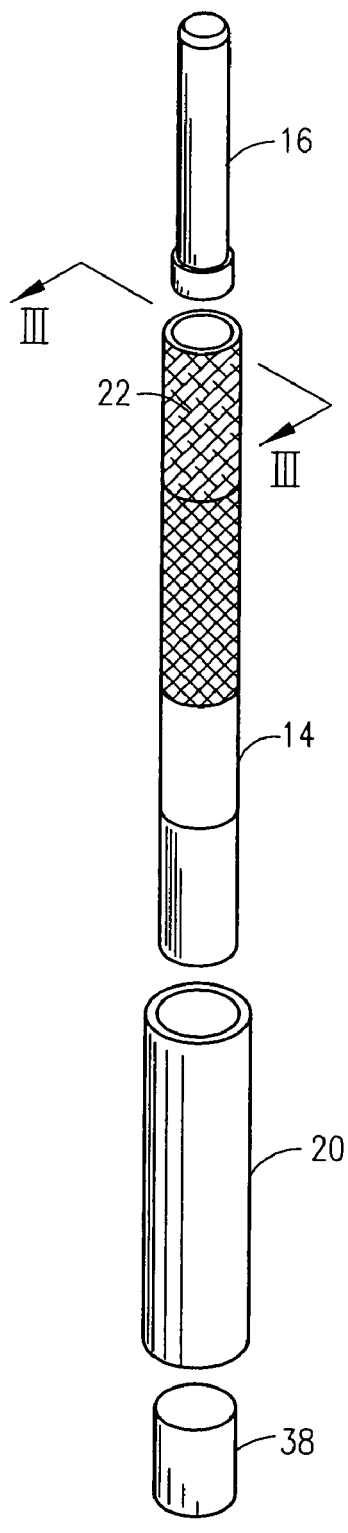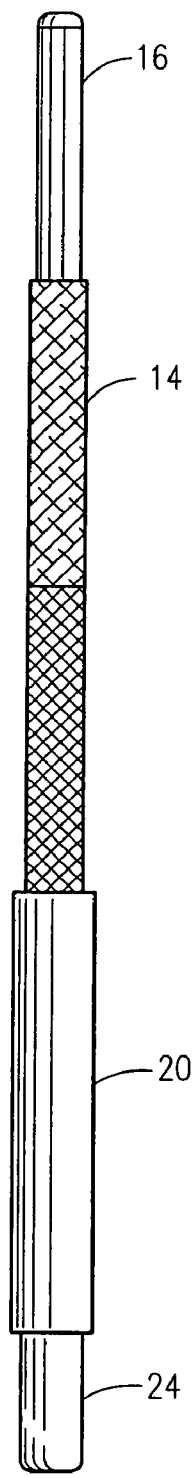
*Fig. 2a*  *Fig. 2b*

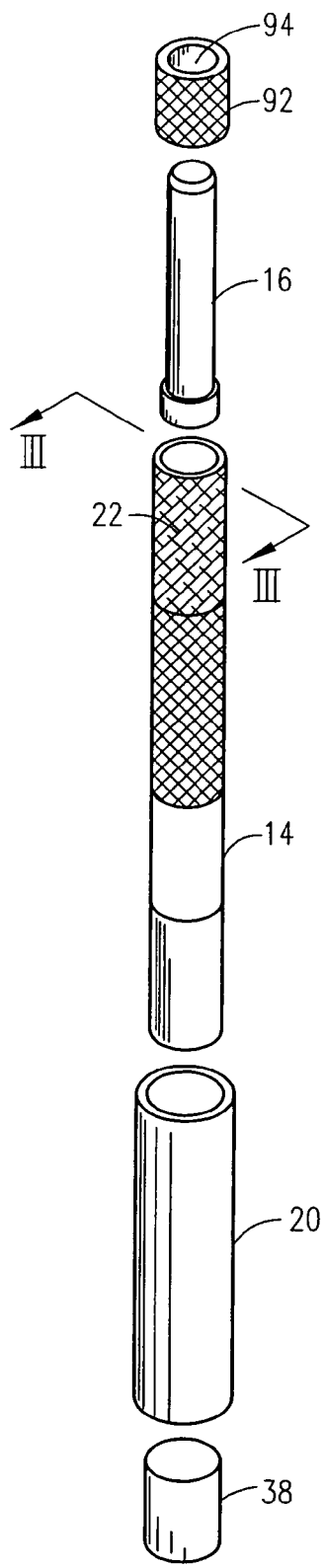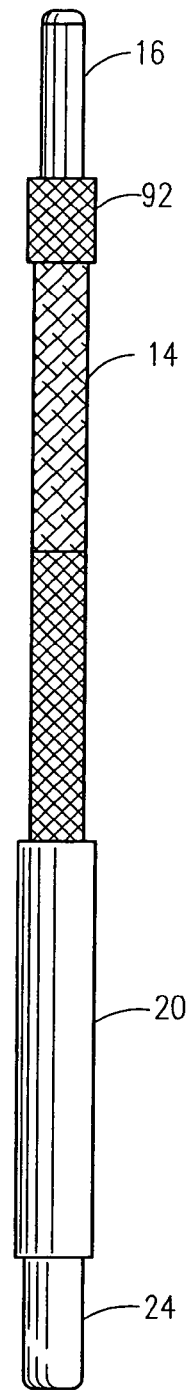
*Fig. 21*     *Fig. 22*

ILLUMINATED SAFETY APPARATUS AND BASE

RELATED APPLICATIONS

There are no previously filed, nor currently any co-pending applications, anywhere in the world.

BACKGROUND OF THE INVENTION

1. Field of the Invention

The present invention relates generally to a device retaining an ambient light source and, more particularly, to a wand coupled to a base for retaining an ambient light source.

2. Description of the Related Art

Many devices have been constructed and employed for illuminating an object, a surface or an area, including candles, lanterns, flashlights, portable lamps, flares, electroluminescent (EL) material and chemiluminescent material. Presently, EL and chemiluminescent technology and material are considered to be superior to the other items denoted, especially in terms of the intensity of light emitted and for the friendlier environmental impact of the technology. In particular, EL and chemiluminescent technology generate high intensity light without the noxious and damaging chemical by-products of flares.

Of particular interest to the present invention, U.S. Pat. No. 6,217,187, issued in the name of Demsko, discloses a baton for displaying and storing chemiluminescent light in the form of a light stick. In particular, Demsko claims a hand-carriable baton for storing and holding light sticks having a tubular body, closure means, and a socket member mounted to the body for holding a light stick. Demsko discloses the possibility of using a base or stand for freely standing the baton to free the user to move about. Demsko also considers the use of bands or stripes of fluorescent material that may be taped or painted onto the body for greater visibility.

However, Demsko fails to disclose sufficient information to enable one to construct the safety apparatus disclosed and claimed by the present invention. Specifically, Demsko fails to enable the coupling of the baton to a base or stand. In contrast, the present invention discloses the coupling between the wand and base. Furthermore, the base of the present invention may include distinct features and arrangements not contemplated by Demsko.

In addition, Demsko discloses the use of fluorescent material on the baton for increased visibility. Fluorescent material suffers from poor lightfastness, in which the material absorbs light, degrading the material and degrading reflective performance of the material. In order to combat degradation of the material and the reflective properties of the material, thicker coats of fluorescent material must be applied and clear, protective top coats must be applied. This adds not only to the efficiency of manufacturing the product, but increases labor time and cost. In contrast, the present invention contemplates the use of reflective material typically used on traffic control devices, such as highway barrels. Reflective material absorbs a minimal quantity of light, thereby optimizing the amount of light reflected. The greater and improved reflectivity of light from the material enhances the visibility of the object that the material is adhered or applied to. Furthermore, reflective material is relatively inexpensive per unit, and requires only a single revolution about the wand to provide an effective mechanism for alerting on-coming traffic. For these, and other reasons that will become apparent by reading the disclosure, the present invention improves upon and overcomes the disadvantages of Demsko.

A search of the prior art did not disclose any patents that read directly on the claims of the instant invention; however, the following references were considered related:

U.S. Pat. No. 4,812,952, issued in the name of Clemens, discloses a self-illuminating floral device;

U.S. Pat. No. 5,036,442, issued in the name of Brown, discloses an illuminated wand having a battery, a circuit board, movable electrical contacts, an on-off switch and a plurality of electric light sources;

U.S. Pat. No. 5,307,251, issued in the name of Shaffer, discloses a pedestrian crossing safety device having a tubular member with a battery, a flourescent outer surface coloring, an on-off switch and strobe light means for emitting light;

U.S. Pat. No. 6,070,987, issued in the name of Jarvik, discloses a hand held illuminated pointer having a hollow shaft, an electrical battery, an electrical inverter, an electroluminescent lamp and an on-off switch;

U.S. Patent Application Publication No. 2004/0080929, published in the name of Golle et al., discloses an electoluminescent safety sign construction.

Consequently, there exists a continuous need for new ideas and enhancements for existing products in the safety apparatus industry.

SUMMARY OF THE INVENTION

It is therefore an object of the present invention to provide an improved safety apparatus.

It is another object of the present invention to provide an improved safety apparatus for freely standing or buoyantly supported, the apparatus emitting a high intensity light for alerting oncoming traffic to a potential danger and/or obstruction.

Briefly described according to one embodiment of the present invention, a safety apparatus having a base, a wand coupled to the base, and an illumination source retained by the wand. The base may include a recess to retain the illumination source, or an additional illumination source. The base may also include a port and a hollow interior for selectively filling the interior with ballast for support. The wand may include reflective material along the external circumference for increasing the visibility of the apparatus to on-coming traffic. The apparatus may be used to freely stand on a solid surface, or the base may be evacuated of ballast and used to buoyantly rest on the surface of an aqueous body.

It is a feature of the present invention to provide a base having an opening for receiving an end of the wand.

It is another feature of the present invention to provide a base having one of a variety of geometric configurations.

It is another feature of the present invention to provide a wand having a plug for enclosing the interior of the wand, and in combination with a coupled and retained illumination source at the opposite end of the end, providing a buoyant wand for floatation on an aqueous body.

It is another feature of the present invention to provide a wand having a tapered end for receiving and retaining the illumination source in an impinged manner.

It is further contemplated that the present invention may include a base having a plurality of recesses for retention of a plurality of illumination sources and/or the retention of an envisioned telescopically adjustable wand. In such a configuration, the apparatus is a compact, light weight and easily storable device that is capable of quick assembly and disassembly.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2a is an exploded perspective view of the wand depicting a removable handle at an end, and the illumination source retained by the wand at an opposing end;

FIG. 2b is a side view of the wand assembled;

FIG. 21 is an exploded perspective similar to FIG. 2a, wherein the apparatus further comprises a collar having an annular ring and aperture and further having reflective material consistent with the reflective material found on the wand; and FIG. 22 is a side view similar to FIG. 2b depicting the collar of FIG. 21.

DESCRIPTION OF THE PREFERRED EMBODIMENTS

Figure 1A:
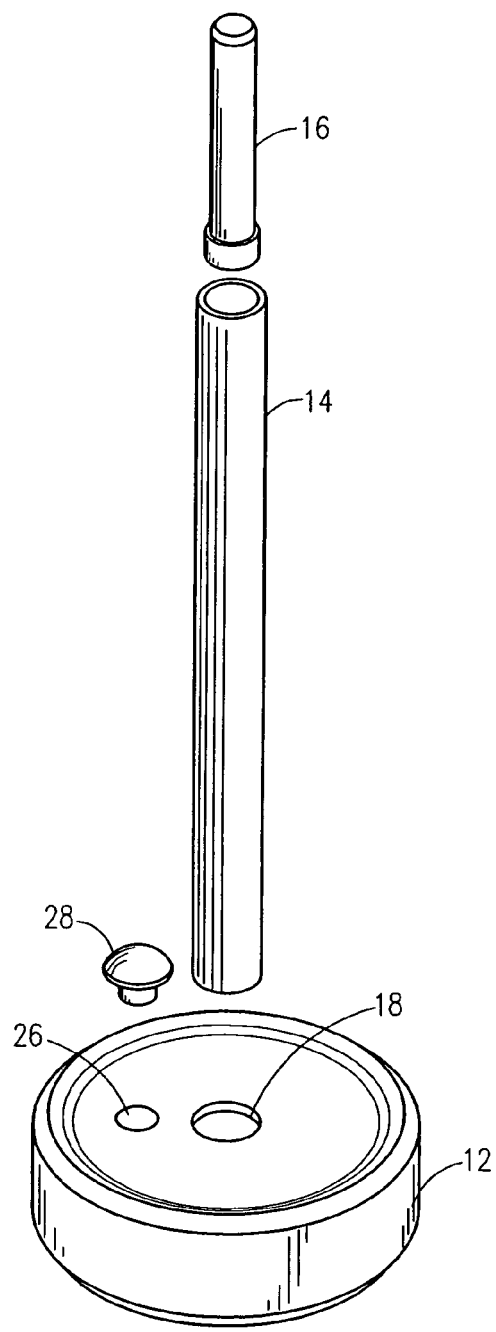
FIG. 1a is an exploded perspective of a preferred embodiment of the present invention, disclosing an illuminated safety apparatus having a base, a wand coupled to the base, and an illumination source retained by the wand.
Figure 1B:
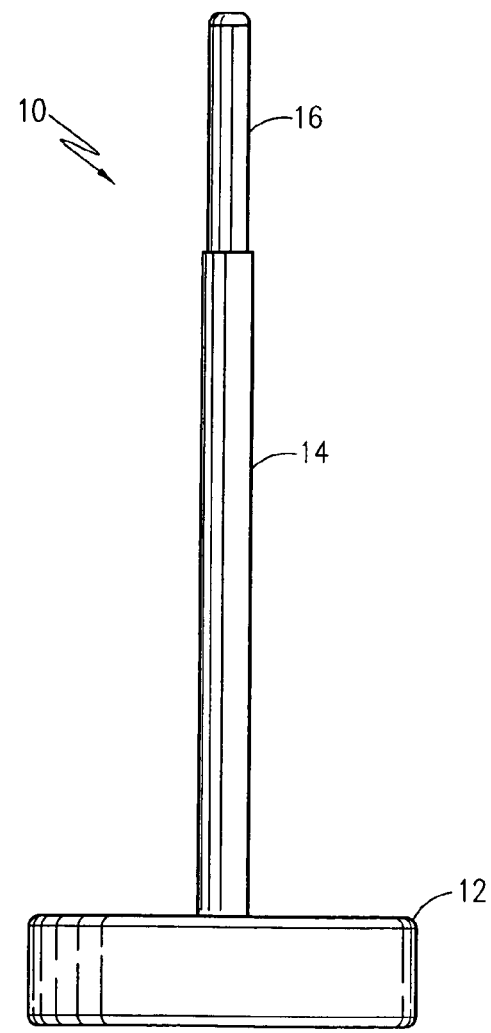
FIG. 1b is a side view of the apparatus assembled.
Figure 3:
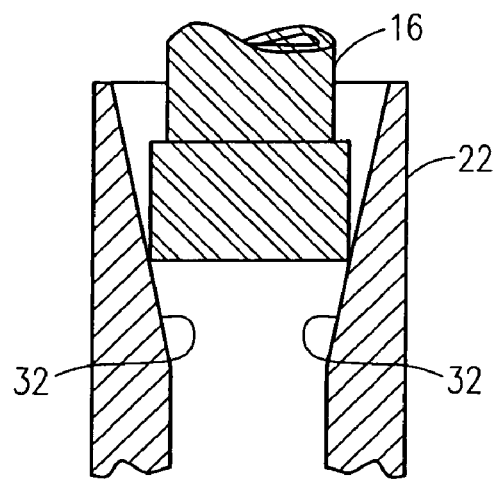
FIG. 3 is a cross-sectional view of the end at which the illumination source is retained by the wand taken along line III—III of FIG. 2a, the sectional view illustrating an internal taper for supporting the illumination source, the internal taper terminating as a skirt or other boundary for providing frictional or interference impingement of the illumination source within the wand.
Figure 4:
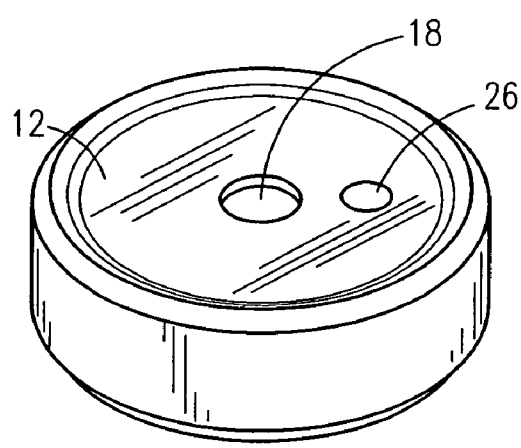
FIG. 4 is a perspective view of the base.

The best mode for carrying out the invention is presented in terms of its preferred embodiment, herein depicted within FIGS. 1 through 21.

1. Detailed Description of the Figures

Referring to FIG. 1 through FIG. 4 and FIG. 9 and FIG. 10, a safety apparatus 10, is shown in accordance to a preferred embodiment of the present invention. The apparatus 10 comprises a base 12, a wand 14 removably coupled to the base, and an illumination source 16 retained by the wand 14. The base has an opening 18 for receiving an end 22 of the wand 14, thereby supporting the wand 14 in an upstanding or upright orientation. The illumination source 16 may comprise any number of sources, including chemiluminescent, electro luminescent, fluorescent, incandescent, light emitting diodes (LED) or other similar sources suitable for transmitting visible light.

The base 12 may have a port 26 fluidly communicated with a hollow interior. The port 26 provides ingress and egress to the hollow interior. A cap 28 for the port 26 may be removed so that ballast may be selectively supplied for filling the hollow interior. In selectively placing ballast within the hollow interior, the base 12 is provided ballast or weight for securely supporting the wand 14 and the illumination source 16 when coupled to the base 12. Ballast may include fluid, sand, gravel, or any other suitable material that may fill the interior for providing a weighted base 12.

Figure 5:
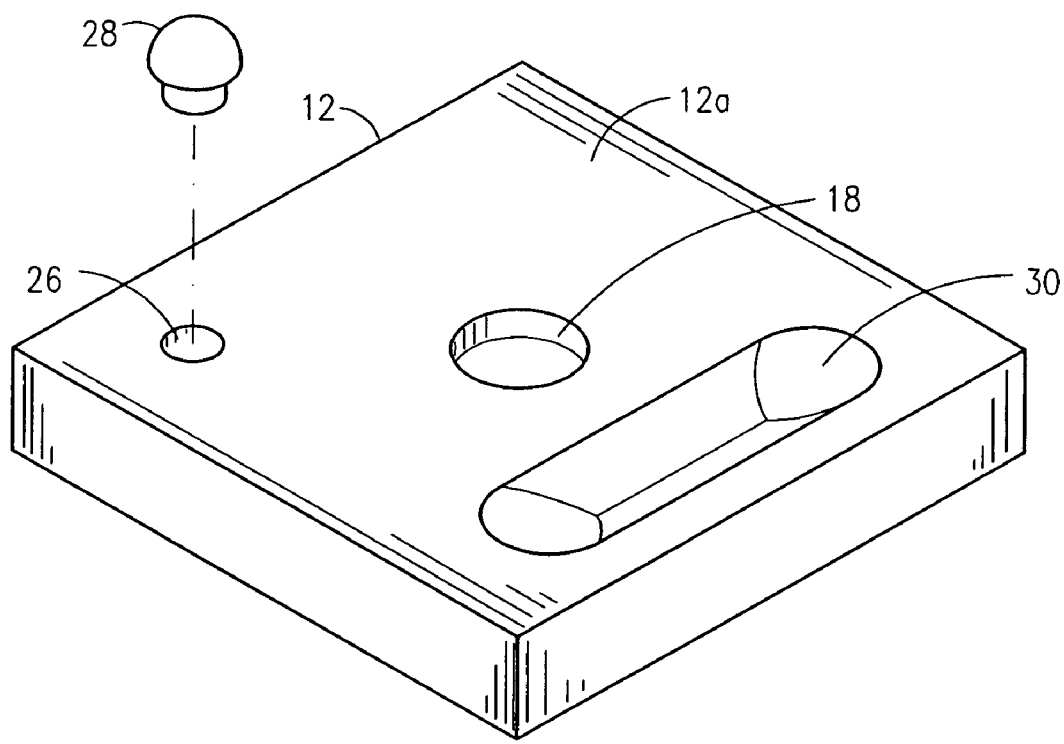
FIG. 5 is a perspective view of an alternate embodiment of the base having a recess formed in the anterior surface thereof.
Figure 6:
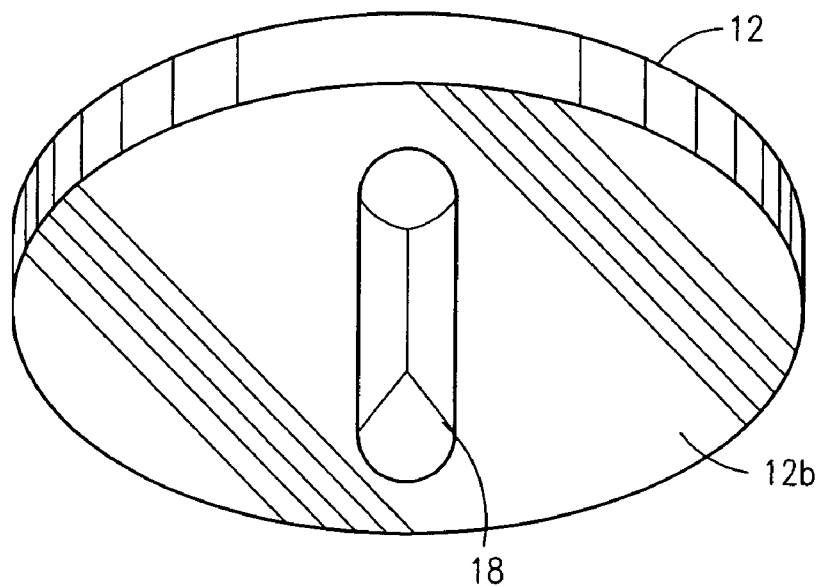
FIG. 6 is a perspective view of an alternate embodiment of the base having a recess formed in the posterior surface thereof.
Figure 7:
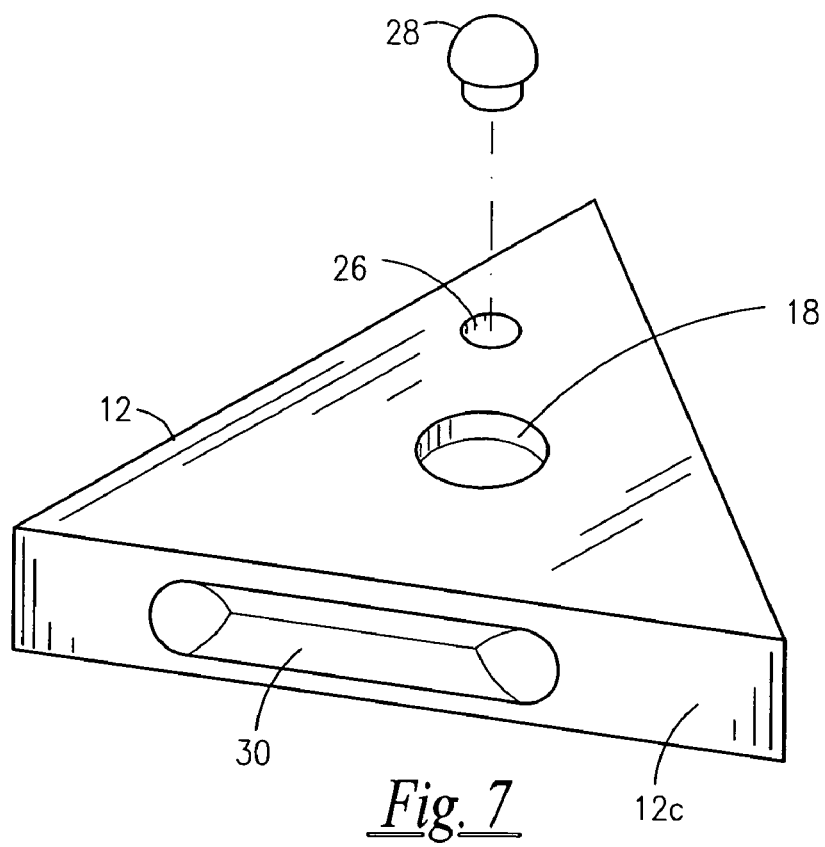
FIG. 7 is a perspective view of an alternate embodiment of the base having a recess formed in a lateral or side surface thereof.
Figure 8:
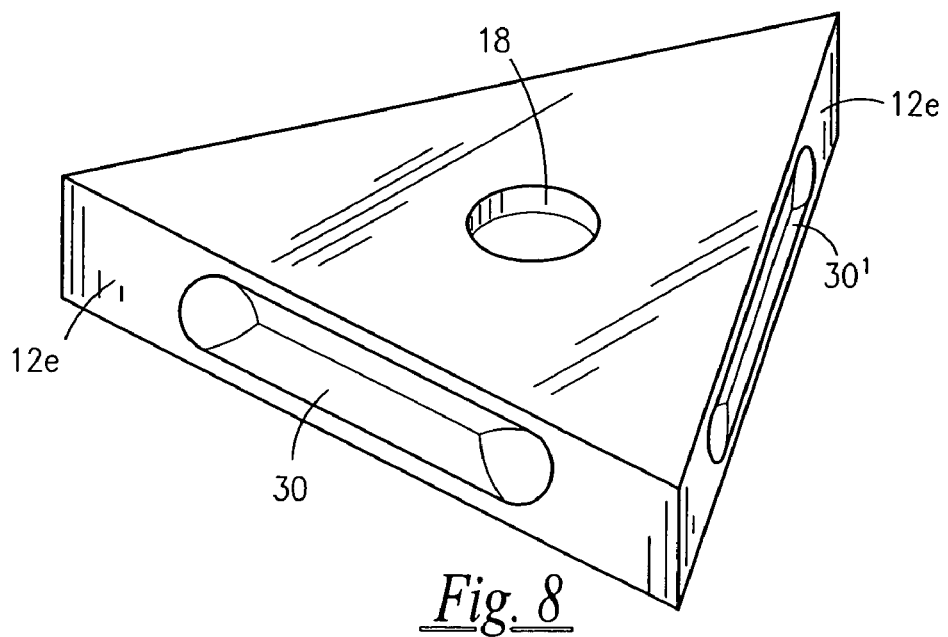
FIG. 8 is a perspective view of an alternate embodiment of the base having a recess formed in two or more of the lateral or side surfaces thereof.
Figure 9:
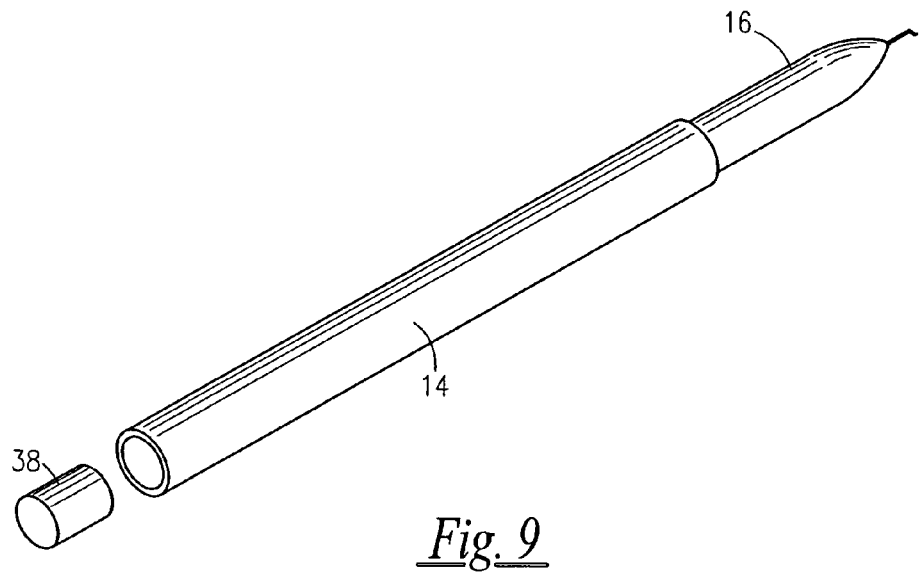
FIG. 9 is a perspective view of the wand having a removable plug for enclosing the storage area, and in combination with the retention of the illumination source, the wand is closed and thus provided with buoyancy on aqueous bodies.
Figure 10:
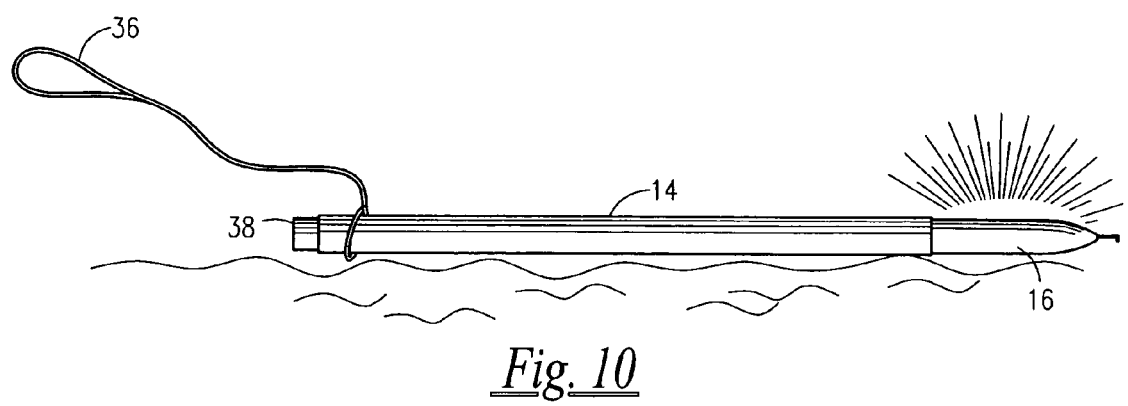
FIG. 10 is a elevation depicting the wand buoyantly supported by an aqueous body.

The base 12 may further include a recess 30 formed on the anterior, posterior or lateral portions of the base 12 structure, the recess 30 retaining an illumination source 16 until utilization of the source 16 is required. FIG. 5 depicts one embodiment of the base 12 having a recess 30 formed in the anterior or superior surface 12a of the base 12. FIG. 6 depicts another embodiment of the base 12 having a recess 30 formed in the posterior or inferior surface 12b of the base 12. FIG. 7 depicts another embodiment of the base 12 having a recess 30 formed in the lateral or side surface 12c of the base 12. FIG. 8 depicts another embodiment of the base 12 having a recesses 30 and 30' formed in the lateral surfaces 12c of the base 12. It is further envisioned that a combination of multiple recess variations may be formed in the base 12, including a recess 30 in the anterior and posterior surfaces 12a and 12b, respectively, a recess 30 in the anterior and lateral surfaces 12a and 12c, respectively, and a recess 30 in the posterior and lateral surfaces 12b and 12c respectively. As is evident from FIG. 5 through FIG. 8, the base 12 may assume a variety of geometric configurations, including the disc or circular configuration of FIG. 4 and FIG. 6, the orthogonal configuration of FIG. 5, or the triangular configuration of FIG. 7 and FIG. 8. Also contemplated are other polygonal configurations, including pentagonal, hexagonal, octagonal, spherical or globular configurations, and other varied configurations.

Figure 11:
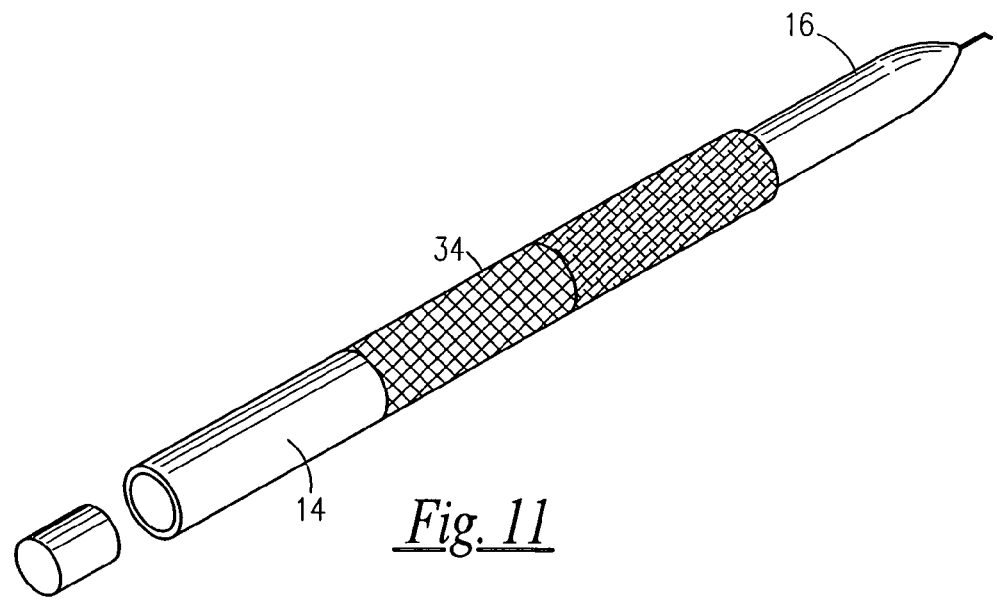
FIG. 11 is a perspective view of an alternate embodiment of the wand having reflective material applied to the external circumference of the wand.
Figure 12:
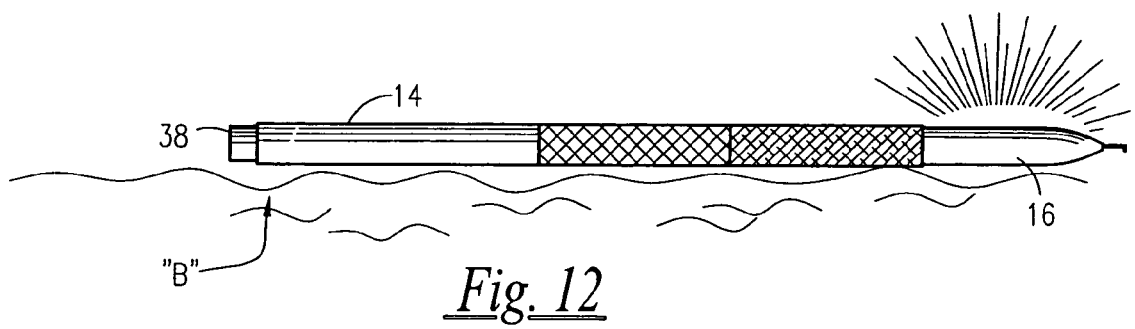
FIG. 12 is an elevation of the wand having reflective material, a plug and buoyantly supported by an aqueous body.
Figure 13:
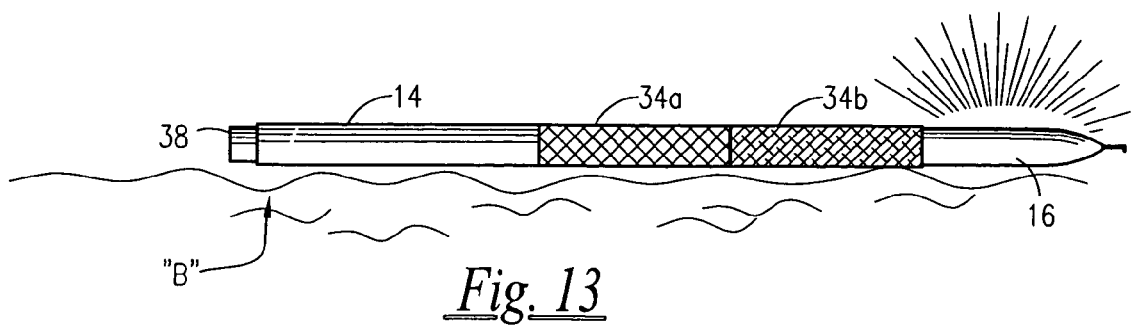
FIG. 13 is an elevation of the wand having reflective material, a plug and buoyantly supported by an aqueous body.

The wand 14 may have a removable handle 20 at an end 24 for grasping and controlling the wand 14 during insertion or removal and, if necessary, to separately use the wand 14 as a hand controlled safety apparatus. The wand 14 has a tubular structure, terminating at opposing ends 22 and 24. The wand 14 has an end 22 internally tapered for retaining the illumination source 16 by frictional and/or gravitational impingement therein. The internal taper terminates as a skirt or other boundary 32, the taper and skirt providing frictional or interference impingement of the illumination source 16 within the wand 14. It is envisioned that the wand 14 may include reflective material 34 about the external surface or circumference of the wand 14. The reflective material 34 is envisioned to be of the type embodied by the 3M® Scotchlite® Reflective Material brand manufactured and sold by Minnesota Mining and Manufacturing Company (or 3M), or other similarly functioning material. As depicted in FIG. 11, FIG. 12 and FIG. 13, the reflective material 34 may comprise a single color (FIG. 11 and FIG. 12) or a plurality of colors (FIG. 13) as generally denoted by 34a and 34b. It is also envisioned that the wand 14 may include a lanyard 36 for assembly and disassembly, for use of the wand 14 by hand, or for retrieving the wand 14 from an aqueous body "B".

Referring now to FIG. 19 through FIG. 22, the safety apparatus 10 may include a collar 90 or 92 having an annular ring and aperture or end 94. The collar 90 or 92 fits onto the wand 14 at the end 22, with the annular ring and aperture 94 allowing penetration of the illumination source 16. The collar 90 or 92 is envisioned as centering the illumination source 16 and firmly supporting the source 16 in a generally upright manner so that the source 16 does not tilt, sway or become dislodged from the wand 14 through incidental contact. As depicted in FIG. 21 and FIG. 22, the collar 92 may also include reflective material consistent with the reflective material provided on the wand 14.

Figure 14:
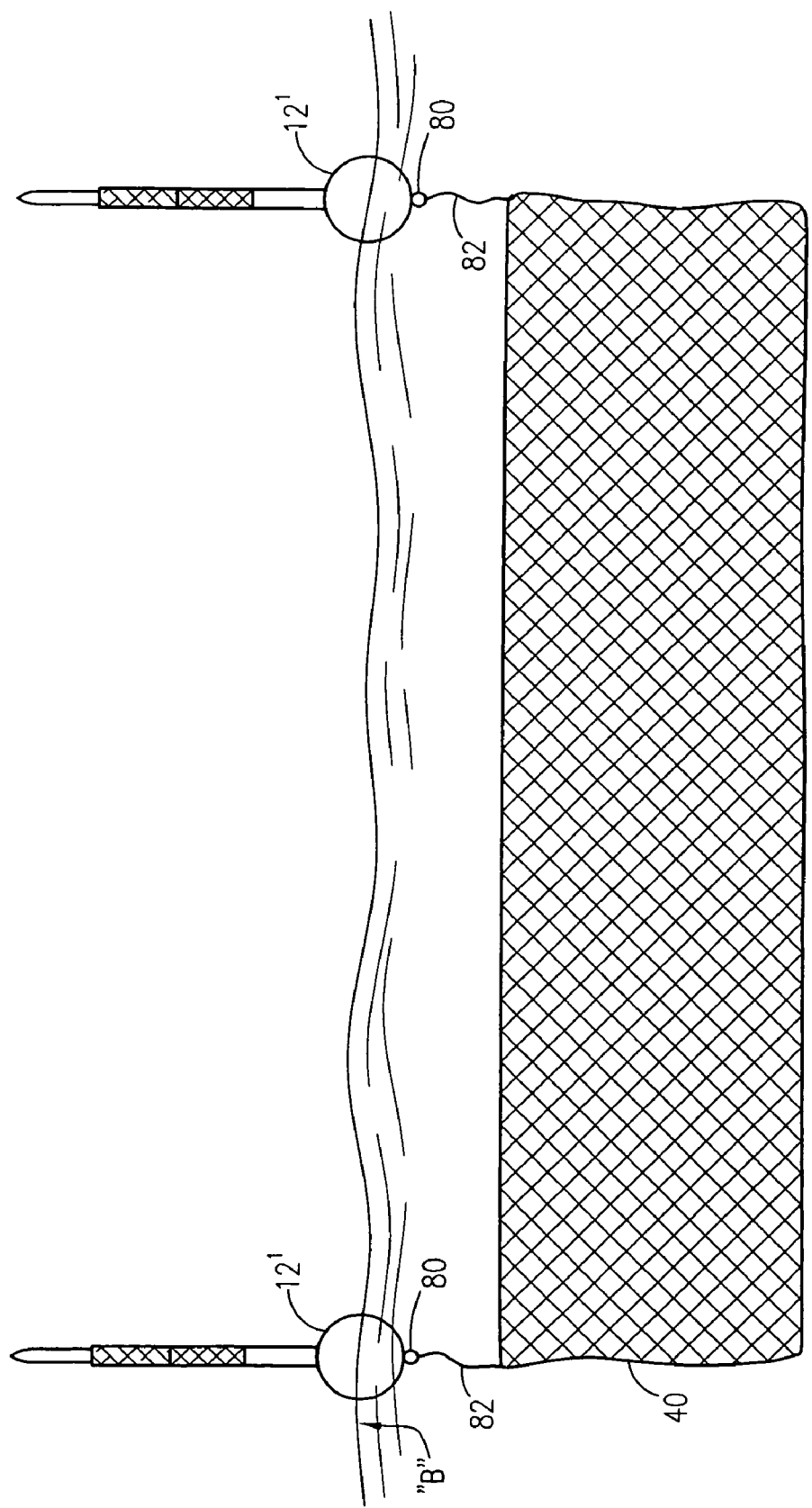
FIG. 14 is a front or rear view of a net with a safety apparatus tethered to the net, the apparatus having a spherical or globular base for flotation on the surface of the body "B"

Referring now to FIG. 9 through FIG. 15, the wand 14 may further include the addition of a plug 38 inserted into the end 24, opposite the end 22 that retains source 16. The plug 38 is inserted to prevent the ingress of aqueous material or fluid. The plug 38 provides the wand 14 with buoyancy (see FIG. 10 through FIG. 15). The wand 14 may then be used in an aqueous environment or body "B", such as a pool, stream, creek, river, lake or ocean for identifying the area for a variety of reasons, including dangerous conditions or for rescue purposes. As depicted in FIG. 14, the wand 14 may be used to identify a harvesting net 40, wherein the wand 14 has a spherical or globular base 12' secured to the net 40. The spherical or globular base 12' provides the apparatus with buoyancy for flotation on the body "B" surface. As further depicted in FIG. 17 and FIG. 18, the base 12' may further include an eyelet 80 for securing a lanyard 82 to the net 40, thereby securing the apparatus in place to operate as a warning or indicator of a particular environment. As depicted in FIG. 14, it is envisioned that a number of apparatuses 10 may be used and spaced apart at predetermined distances so that the length of the netting 40 will be visible to approaching water craft and swimmers.

Figure 15:
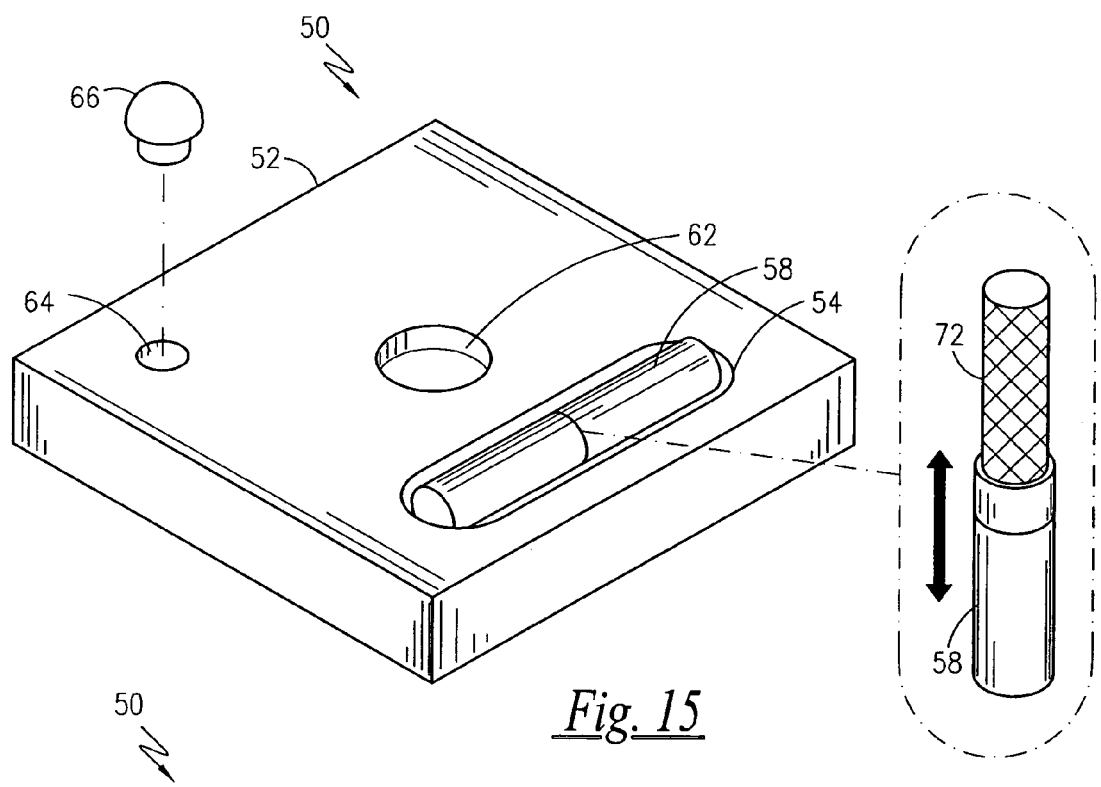
FIG. 15 is a perspective view of an alternate embodiment of the present invention in which a plurality of recesses are formed in the base, one recess for retaining a telescopically adjustable wand, and at least one other recess for retaining an illumination source.
Figure 16:
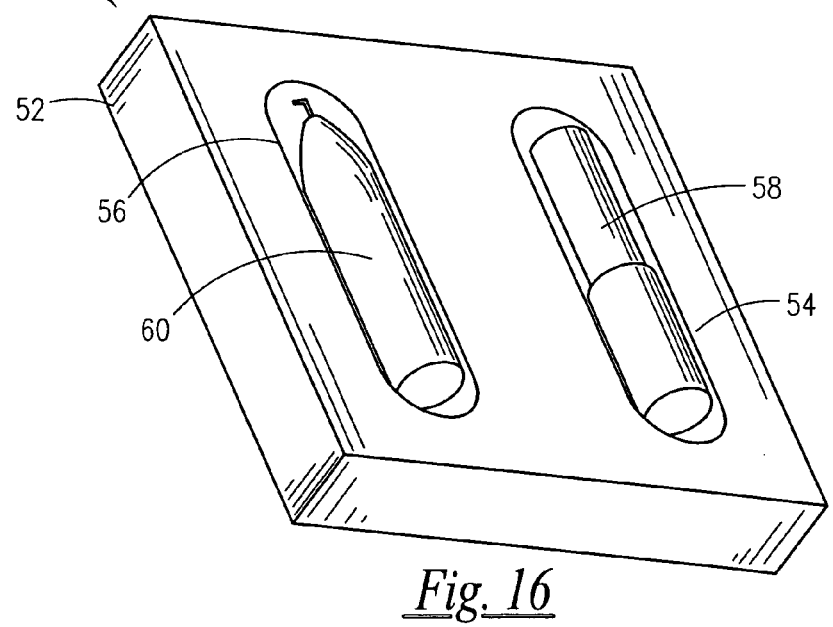
FIG. 16 is a perspective view of FIG. 17 depicting the recess retaining the illumination source.
Figures 17, 18:
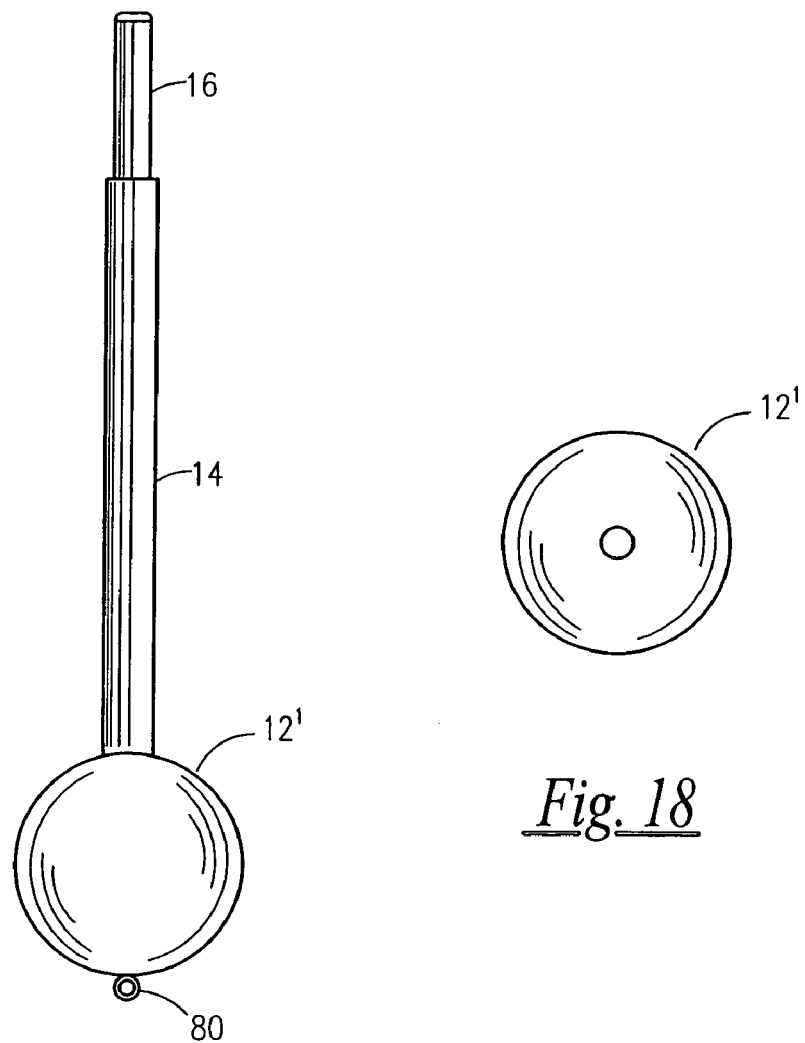
FIG. 17 is a front or side view of an apparatus having a spherical or globular base and an eyelet for tethering the apparatus to an object.
FIG. 18 is a top view of the spherical or globular base.
Figure 19:
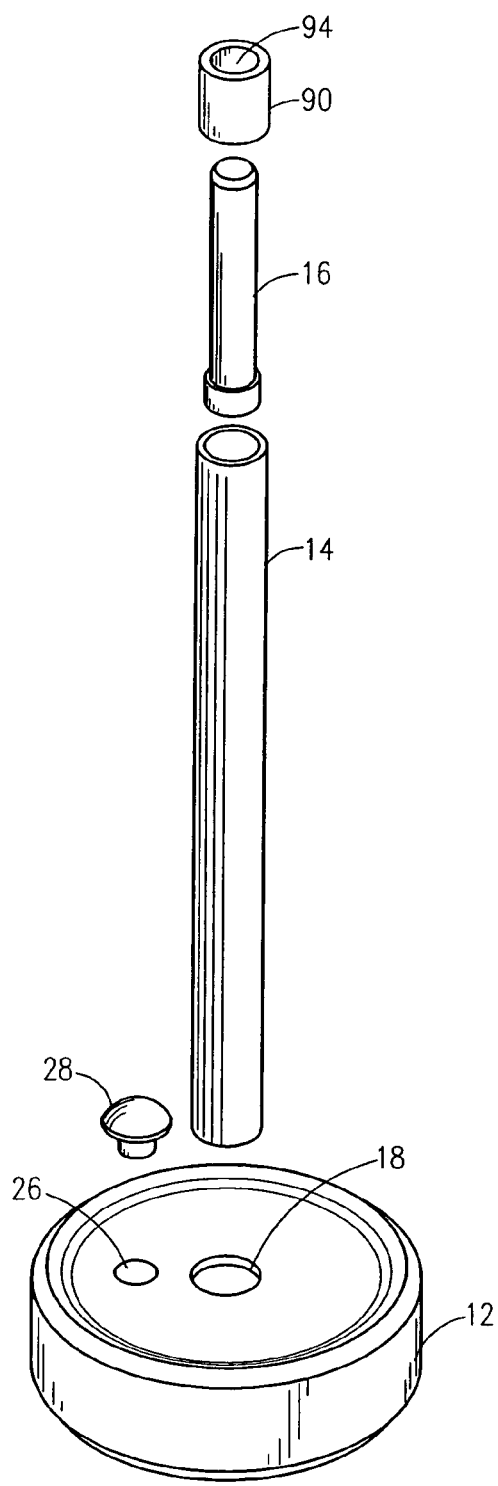
FIG. 19 is an exploded perspective similar to FIG. 1a, wherein the apparatus further comprises a collar having an annular ring and aperture.
Figure 20:
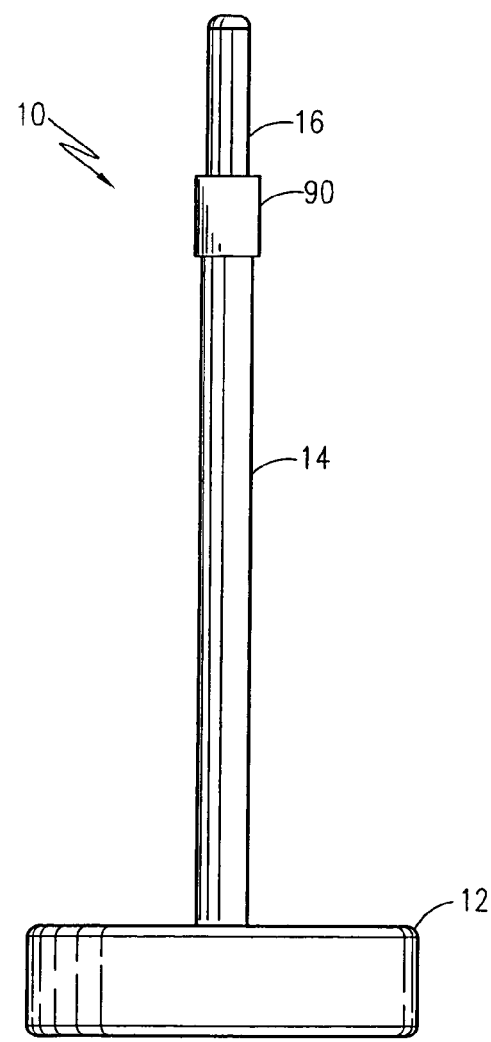
FIG. 20 is a side view similar to FIG. 1b depicting the collar of FIG. 19.

Referring now to FIG. 15 and FIG. 16, another embodiment of the present invention is depicted, wherein the apparatus 50 comprises a base 52 having at least a pair of recesses 54 and 56. One recess 54 retains the wand 58 and the other recess 56 retains the illumination source 60. In this embodiment, the wand 58 is telescopically adjustable for extending and collapsing the structure and is inserted in an opening 62. This embodiment is envisioned as providing a convenient and easily transported apparatus for assembly and use as a safety apparatus. The base 52 may incorporate some, many or all of the limitations disclosed previously, including the use of a port 64 and cap 66 for ingress and egress to a hollow interior, or the variant geometric configurations discussed previously. The wand 58 comprises opposing ends 68 and 70, one end for retaining the illuminating source 60 as previously disclosed (by an internal taper), and optionally, the other end receiving and accommodating the insertion of an additional illumination source for storage. The wand 58 may include the reflective material 72 as previously disclosed, the material 72 applied to the external surface or circumference of the wand 58.

The present invention is envisioned as a safer alternative to the conventional fuses (also known as "fusies") used for illumination. Because a "fusie" is an incendiary device, the potential for accidental injuries, death, property damage or other damage is minimized by using the present invention. Furthermore, a "fusie" is a potential weapon for a terrorist that may not arouse the suspicion other "prohibited" items might (e.g., box cutters). Thus, the present invention is envisioned as a responsible and effective replacement for "fusie"-type illumination devices.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

To use the present invention, a user will place the wand 14 into the base 12, and place the base 12 in a location advantageous for casting the greatest illumination to the area of concern. The illumination source 16 is activated and placed into the tapered end 22 of the wand 14, the wand 14 thereby retaining the illumination source 16. Reflective material 34 optionally provided along the external surface of the wand 14 reflects oncoming light back to the source, thereby further indicating the positioning of the apparatus 10. Ballast may be added to the base 12 through port 26, thereby providing further stability to the apparatus 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. An illuminated safety apparatus comprising:
 a base;
 a wand removably coupled to said base, said wand having reflective material, and said wand having an end internally tapered for retaining an illumination source; and a port fluidly communicating with a hollow interior of the base forselectively filling said hollow interior with ballast.

2. The apparatus of claim 1, wherein said base has an opening receiving an end of said wand.

3. The apparatus of claim 1, wherein said base has a spherical form and buoyancy for flotation on an aqueous surface.

4. The apparatus of claim 1, said base further comprising a recess formed therein for retaining said illumination source until utilization of said illumination source is required.

5. The apparatus of claim 1 further comprising a collar having an annular ring and aperture, said collar mounted on said wand for centering and supporting said illumination source.

6. The apparatus of claim 1, wherein said wand has a removable handle at said end.

7. The apparatus of claim 1, wherein said wand has a plug for enclosing an end, said wand buoyant in aqueous material thereafter, and wherein said plug enclosing a storage area of said wand for storing an additional illumination source.

8. The apparatus of claim 1 further comprising a lanyard depending from said wand.

9. The apparatus of claim 1, wherein said illumination source comprises a chemiluminescent light stick.

10. The apparatus of claim 1, wherein said illumination source comprises an electroluminescent system.

11. An illuminated safety apparatus comprising:
a base;
a wand removably coupled to said base, said wand having reflective material,
an illumination source retained by said wand; and
a collar having an annular ring and aperture, said collar mounted on said wand for centering and supporting said illumination source.

12. The apparatus of claim 11, wherein said base has an opening receiving an end of said wand.

13. The apparatus of claim 11, wherein said base has a port fluidly communicating with a hollow interior for selectively filling said hollow interior with ballast.

14. The apparatus of claim 11, said base further comprising a recess formed therein for retaining said illumination source until utilization of said illumination source is required.

15. The apparatus of claim 11, wherein said wand has an end internally tapered for retaining said illumination source.

16. The apparatus of claim 11, wherein said wand has a removable handle at said end.

17. The apparatus of claim 11, wherein said wand has a plug for enclosing an end, said wand buoyant in aqueous material thereafter, and wherein wherein said plug enclosing a storage area of said wand for storing an additional illumination source.

18. The apparatus of claim 11 further comprising a lanyard depending from said wand.

19. An illuminated safety apparatus comprising:
a base having a recess;
a wand removably coupled to said base, said wand having an end internally tapered for retaining an illumination source; and
said illumination source retained in said wand before utilization, and said illumination source retained in said wand for utilization.

20. The apparatus of claim 11, wherein said base has an opening receiving an end of said wand.

21. The apparatus of claim 19, wherein said base has a port fluidly communicating with a hollow interior for selectively filling said hollow interior with ballast.

22. The apparatus of claim 19, wherein said base has a spherical form and buoyancy for flotation on an aqueous surface.

23. The apparatus of claim 19, wherein said wand has reflective material.

24. The apparatus of claim 19 further comprising a collar having an annular ring and aperture, said collar mounted on said wand for centering and supporting said illumination source.

25. The apparatus of claim 19, wherein said wand has a removable handle at said end.

26. The apparatus of claim 19, wherein said wand has a plug for enclosing an end, said wand buoyant in aqueous material thereafter, and wherein said plug enclosing a storage area of said wand for storing an additional illumination source.

27. The apparatus of claim 19 further comprising a lanyard depending from said wand.

28. The apparatus of claim 19, wherein said illumination source comprises a chemiluminescent light stick.

29. An illuminated safety apparatus comprising:
a base;
a wand removably coupling to said base, said wand having reflective material, said wand having an end internally tapered for retaining an chemiluminescent light stick;
said wand having a plug for enclosing an end thereof;
a collar having an annular ring and aperture, said collar mounting on said wand for centering and supporting said chemiluminescent light stick; and
a lanyard depending from said wand.

30. The apparatus of claim 29, wherein said base having a port fluidly communicating with a hollow interior for selectively filling said hollow interior with ballast.

31. The apparatus of claim 29 further comprising a removable cap inserting into said port.

32. The apparatus of claim 29, said base further comprising a recess formed therein for retaining a chemiluminescent light stick until utilization of said chemiluminescent light stick is required.

33. The apparatus of claim 29, said base further comprising an opening formed therein for coupling to said wand.

34. The apparatus of claim 29, said wand further comprising a removable handle.

35. The apparatus of claim 29, said plug enclosing a storage area of said wand for storing an additional chemiluminescent light stick.

* * * * *